United States Patent

[11] 3,599,077

| [72] | Inventor | Dieter R. Lohrmann<br>Eatontown, N.J. |
|---|---|---|
| [21] | Appl. No. | 47,503 |
| [22] | Filed | June 18, 1970 |
| [45] | Patented | Aug. 10, 1971 |
| [73] | Assignee | The United States of America as represented by the Secretary of the Army |

[54] HIGH-EFFICIENCY, CONTROLLABLE DC TO AC CONVERTER
4 Claims, 2 Drawing Figs.

[52] U.S. Cl. ................................................ 321/44,
321/46, 307/240
[51] Int. Cl. ............................................... H02m 7/48
[50] Field of Search .................................... 321/2, 44,
46; 323/22 T; 307/240

[56] References Cited
UNITED STATES PATENTS

| 3,005,955 | 10/1961 | Grant | 321/2 X |
| 3,263,099 | 7/1966 | Bedford | (321)/(2) |
| 3,305,794 | 2/1967 | Seulig | (321)/(46) |
| 3,321,697 | 5/1967 | Etter | 321/45 |
| 3,349,314 | 10/1967 | Giannamore | 321/43 |
| 3,353,032 | 11/1967 | Morgan et al. | (321)/(2 UX) |
| 3,359,484 | 12/1967 | Johnson | 321/46 X |
| 3,458,799 | 7/1969 | Collings | 321/44 |
| 3,523,239 | 8/1970 | Heard | 321/2 X |

Primary Examiner—William M. Shoop, Jr.
Attorneys—Harry M. Saragovitz, Edward J. Kelly, Herbert Berl and Charles F. Gunderson ABSTRACT: This disclosure relates to DC to AC converters and particularly to converters where a source of direct current is periodically connected to and disconnected from a filtered load circuit to produce an effectively, alternating current of controllable characteristics in the load circuit. More particularly, this disclosure relates to a converter that includes an inductor, in the switched DC circuit, with an additional winding connected to feed back current to the source of direct current during the half cycle when the DC source is disconnected from the load.

PATENTED AUG 10 1971         3,599,077

INVENTOR,
DIETER R. LOHRMANN

BY: Charles F. Gunderson    AGENT
Harry M. Saragovitz,
Edward J. Kelly & Herbert Berl
ATTORNEYS

HIGH-EFFICIENCY, CONTROLLABLE DC TO AC CONVERTER

The invention described herein may be manufactured, used, and licensed by or for the Government for governmental purposes without the payment to me of any royalty thereon.

BACKGROUND OF THE INVENTION

Almost all of the prior art, DC to AC converters involve switching means for connecting and disconnecting a DC source to and from a load at regular intervals, or switching means for periodically reversing the polarity of the connection of a DC source across a load to alternate the direction of the flow of current through the load. Many of these systems use transformers to step-up the voltage level of the resulting alternating current, since the voltage levels of the readily available batteries, or sources of direct current, are usually lower than the voltage levels required for operating many of the AC devices in use today.

One of the main problems, however, is that of efficiency since batteries have a limited supply of energy, and the trend, if not the requirement, for portable and vehicular power converters today is to be as compact and light as possible. Increased efficiency, obviously, gives more power output for a given input, and also reduces size and weight by reducing the losses and the power dissipation that would otherwise require larger and heavier heat sinks. Simplicity of design and a minimum number of parts keeps the equipment as compact and as light as possible and also reduces the possibility of failures of the equipment.

It is therefore an object of this invention to provide an improved, simple, efficient, DC to AC converter.

It is a further object of this invention to provide an improved DC to AC converter of relatively high efficiency; and of minimum size and weight, that has a controllable output.

SUMMARY OF THE INVENTION

These objects are achieved by connecting a source of direct current through one winding of a transformer to a grounding switch as well as to a coupling capacitor that connects through a filter to an output load. The transformer has another winding that is connected, through a diode, across the source of direct current. The diode is in a direction to block the flow of current from the source through the other winding. The closing of the switch grounds the side of the capacitor that was at the voltage of the DC source, which applies a corresponding change in voltage through the filter to the output load. The closing of the switch also starts current flowing through the one winding of the transformer, which builds up a magnetic field in the core of the transformer and induces a current in one direction in the other transformer winding. This winding is polarized to have this current, in this one direction, also blocked by the diode.

After a given interval the switch is opened and the voltage across the capacitor and the load are restored to their former levels to complete an alternating current cycle across the load. During this time, the current through the one transformer winding must decrease to induce a current in the other direction in the other transformer winding. This current now flows through the diode and back into the power supply, until the voltages in the transformer and across the diode are reversed. The periodic opening and closing of the transistor switch converts power from the source of direct current into alternating current. The fundamental frequency is filtered out and applied to the load, and the power in the harmonics fluctuates back and forth between the reactors of the circuit and the source of direct current. Thus, ideally, no power consumption takes place on the harmonics, DC power supplied by the battery is converted to the sine wave output signal, and all the energy from the breakdown of the current in the transformer is returned to the power supply. The amplitude and waveform of the output, sine wave signal can be influenced by varying the duty cycle of the transistor switch.

DETAILED DESCRIPTION OF THE PREFERRED EMBODIMENT

Figure 1:
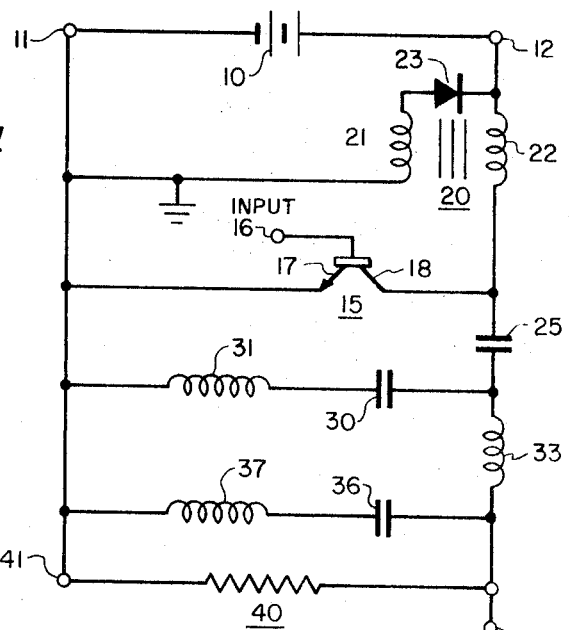
FIG. 1 shows a circuit diagram of the invention.

Referring now to FIG. 1 a source of direct current 10 has terminals 11 and 12. Terminal 12 is connected through one winding 22 of transformer 20 to the collector 18 of switching transistor 15 whose emitter 17 is connected to the terminal 11 of the power supply, that can be considered at ground potential. The collector 18 is also connected through a capacitor 25 and an inductor 33 to one of the terminals 42 of an output load 40. The other terminal 41 of the output load is also connected to the grounded terminal 11 of the power supply. The inductor 33 is a part of a filter network including condenser 30, inductor 31, condenser 36 and inductor 37.

Another winding 21 of the transformer 20 is connected in series with a diode 23 across the terminals 11 and 12 of the source of direct current, with the diode being polarized to block the flow of current from the source through the winding 21.

In operation, with the switching transistor 15 open, the side of the capacitor 25 connected to the collector electrode 18 is, on the average, at the potential of the power supply terminal 12 because of the DC path through winding 22. The other side of the capacitor is at ground potential because of the DC path through the resistive output load and inductor 33.

Figure 2:
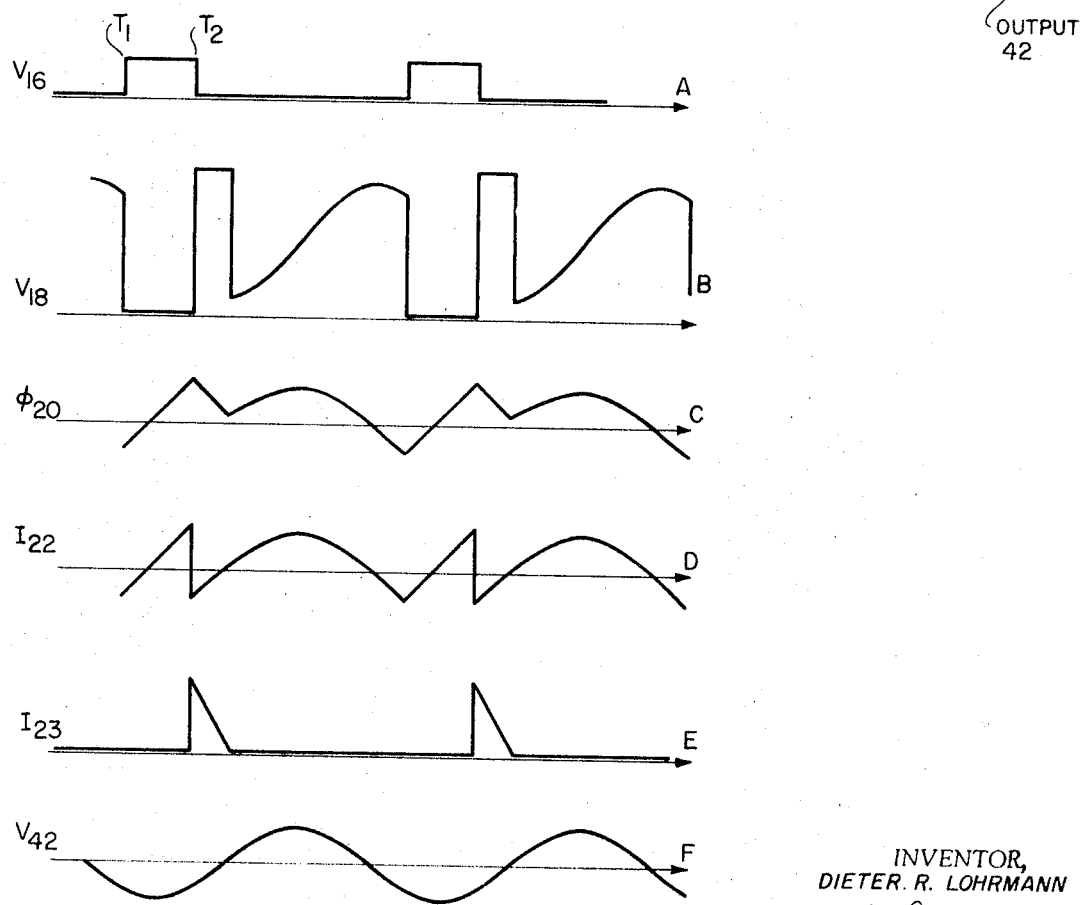
FIG. 2 shows a series of waveforms to explain the function of the various elements in the circuit.

When a switching signal, as illustrated in A of FIG. 2, is applied at the control terminal 16 to the base electrode of the switching transistor, the transistor is alternately switched from an open to a closed or shorted condition at time T1 and back to an open condition at time T2. The time axis is the same for all the curves of FIG. 2.

When the transistor is shorted to ground, the collector electrode of the transistor and the corresponding one side of the capacitor 25 are effectively grounded, as seen in B of FIG. 2, and the other side of the capacitor goes from ground potential to a negative voltage equivalent of the change in voltage at 18.

At the same time, the winding 22 of the transformer 20 is also shorted to ground across the power supply, and current starts to flow through the winding. The current in the winding 22 increases linearly with respect to time, as seen in D of FIG. 2, because of the inductance of the transformer. This change in current builds up a magnetic field, as seen in C of FIG. 2, in the core of the transformer and induces a voltage across the other winding 21 of the transformer 20. The other winding is connected so that the polarity of this induced voltage is negative with respect to ground; and the diode 23 continues to block this polarity of voltage from the source of direct current. No current flows through the winding 21, as seen in E of FIG. 2 and no energy is drawn from the winding 22.

After a given interval, at time T2, the transistor is switched back to an open condition. This opens the circuit through the winding 22 to ground. The current in winding 22 now starts to decrease, inducing a voltage of reversed polarity across windings 22 and 21. This change in voltage across the winding 22 is transmitted to the capacitor 25, as seen in B of FIG. 2, and through the capacitor and the filter network, to the output load at 42 to complete one-half cycle of alternating current, as seen winding F of FIG. 2; and to start the next half cycle.

When the induced voltage of reversed polarity across winding 21 exceeds the level of the source 10, the diode 23 conducts and current flows through the winding 21, as shown in E of FIG. 2, back into the source 10. This utilizes the inductive energy stored up in the transformer core and restores it to the power supply to increase the efficiency of this converter. When the current through the winding 21 ceases, the voltage across the winding 21 drops below the voltage of the source and the current through windin 21 is again blocked by the diode 23. The potential at the collector 18 and the capacitor across the output load is restored to the starting condition to complete the other half cycle of the alternating current prior to the next shorting of the switching transistor to ground.

The transformer 20, aside from avoiding a direct short circuit across the power supply, draws energy from the power supply and stores it in the form of a magnetic field in the transformer core. This stored energy drives the voltage on the capacitor, and across the load, in the opposite direction, when the transistor switch is opened, to increase the effective AC output and provide a smoother waveform.

The filter network with inductors and capacitors 30 through 37 is of the basic, low-pass filter configuration. Its function is to pass the energy on the fundamental and to reject as much as possible of the harmonics which are created by the DC switching. A tuned, resonant filter or band-pass filter may also be used, or more than one filter can be used to improve the waveform of the output. The filter components must be of sufficient size and current-carrying capabilities to handle the anticipated power.

The transformer must also be of sufficient size and inductance, and the transistor must be of sufficient rating to handle the anticipated currents.

The frequency of the switching signal should be the desired output frequency although in certain situations, harmonics may be usable.

The amplitude of the output signal will depend on the voltage and power available in the source, and the size of the switching transistor. The amplitude can also be controlled by varying the portion of the cycle during which the transistor is switched on, or by varying the amplitude of the switching pulse.

Since all elements except the diode and the transistor are reactors, ideally, they will not dissipate any energy. Neither will the transistor and the diode, since they act in a switched mode. Hence, very high conversion efficiency may be expected from this current in a practical embodiment, while providing a sine wave output with controllable amplitude.

It is to be understood that this should not be limited to the exact details of construction as described, for obvious modifications will occur to a person skilled in the art.

What I claim is:

1. A direct current to alternating current converter comprising a source of direct current with respect to ground; a switching means having one grounded terminal and one ungrounded terminal; a transformer having a first winding and a second winding; means for connecting said first winding of said transformer between said source of direct current and said ungrounded terminal of said switching means; a load impedance having one grounded terminal and one ungrounded terminal; a low-pass filter connected to said ungrounded terminal of said load impedance; a coupling capacitor connected said ungrounded terminal of said switching means through said low-pass filter, to said ungrounded terminal of said load impedance; diode means, normally nonconducting, connected in series with said second winding of said transformer across said source of direct current; and means for actuating said switching means, alternately, on and off.

2. A direct current to alternating current converter as in claim 1 wherein said low-pass filter comprises a first filter capacitor, a second filter capacitor, a first inductor, a second inductor, and a third inductor; said third inductor being connected between said ungrounded terminal of said load impedance and said coupling capacitor; said first filter capacitor and said first inductor being connected in series with said coupling capacitor across said switching means; and said second filter capacitor and said second inductor being connected in series across said load impedance.

3. A direct current to alternating current converter as in claim 1 wherein said switching means is a transistor, having an output circuit and an input circuit; said transistor output circuit being connected between said first winding of said transformer and said ground; and said transistor input circuit being connected to said means for actuating said switching means.

4. A direct current to alternating current converter as in claim 1 wherein said second winding of said transformer is connected to induce current of a polarity to be conducted through said diode, back into said source, when said switching means is open.